(12) United States Patent
Suzuki

(10) Patent No.: US 10,140,080 B2
(45) Date of Patent: Nov. 27, 2018

(54) PROJECTOR AND CONTROL METHOD

(71) Applicant: SEIKO EPSON CORPORATION, Tokyo (JP)

(72) Inventor: Kazumi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/761,835

(22) PCT Filed: Mar. 7, 2014

(86) PCT No.: PCT/JP2014/001288
§ 371 (c)(1),
(2) Date: Jul. 17, 2015

(87) PCT Pub. No.: WO2014/147988
PCT Pub. Date: Sep. 25, 2014

(65) Prior Publication Data
US 2015/0339092 A1  Nov. 26, 2015

(30) Foreign Application Priority Data
Mar. 18, 2013 (JP) .................. 2013-055372

(51) Int. Cl.
*G06F 3/14* (2006.01)
*H04N 5/74* (2006.01)
(Continued)

(52) U.S. Cl.
CPC ........ *G06F 3/1415* (2013.01); *G06F 3/03542* (2013.01); *G06F 3/1438* (2013.01); *H04N 5/74* (2013.01); *H04N 2013/0461* (2013.01)

(58) Field of Classification Search
CPC .............. H04N 5/74; H04N 2013/0461; G06F 3/1415; G06F 3/1438; G06F 3/03542
(Continued)

(56) References Cited

U.S. PATENT DOCUMENTS 5,838,015 A * 11/1998 Burdick .................. G01J 5/52
                                                   250/495.1
6,104,512 A    8/2000 Batey, Jr. et al.
(Continued)

FOREIGN PATENT DOCUMENTS

JP    2011-128175 A    6/2011
JP    2012-173447 A    9/2012
(Continued)

OTHER PUBLICATIONS

Jul. 15, 2014 International Search Report issued in International Patent Application No. PCT/JP2014/001288.
(Continued)

Primary Examiner — Stacy Khoo
(74) Attorney, Agent, or Firm — Oliff PLC

(57) ABSTRACT

A projector includes a plurality of transmitters each of which transmits a signal, a receiver that receives signals transmitted from another projector, and a control unit that achieves synchronization of the signals between the projector and the another projector based on the signals transmitted from the another projector and received by the receiver. The control unit includes a state judgment portion that judges whether or not the synchronization with the another projector is stable and a number determination portion that determines the number of transmitters to be used among the plurality of transmitters based on the judgment result made by the state judgment portion.

7 Claims, 3 Drawing Sheets

(51) Int. Cl.
*G06F 3/0354* (2013.01)
*H04N 13/04* (2006.01)

(58) Field of Classification Search
USPC ............. 345/1.1–1.3, 2.1–2.2; 709/223
See application file for complete search history.

(56) References Cited

U.S. PATENT DOCUMENTS

| | | | |
|---|---|---|---|
| 2003/0164461 A1* | 9/2003 | Kelly, Jr. | F41G 7/004 250/504 R |
| 2008/0253418 A1 | 10/2008 | Egawa et al. | |
| 2011/0141380 A1 | 6/2011 | Ichimasa | |
| 2011/0234474 A1* | 9/2011 | Natori | H04N 5/04 345/1.3 |
| 2012/0212415 A1 | 8/2012 | Yokobayashi | |

FOREIGN PATENT DOCUMENTS

| | | |
|---|---|---|
| JP | 2013-012877 A | 1/2013 |
| WO | 9938279 A1 | 7/1999 |

OTHER PUBLICATIONS

Cha, Moohyun et al., "A VR-based Tiled display system for the Distributed Visualization," Korea Society of CAM/CAM Engineers, vol. 15, No. 3, pp. 167-177, Jun. 2010.

* cited by examiner

[Fig. 1]
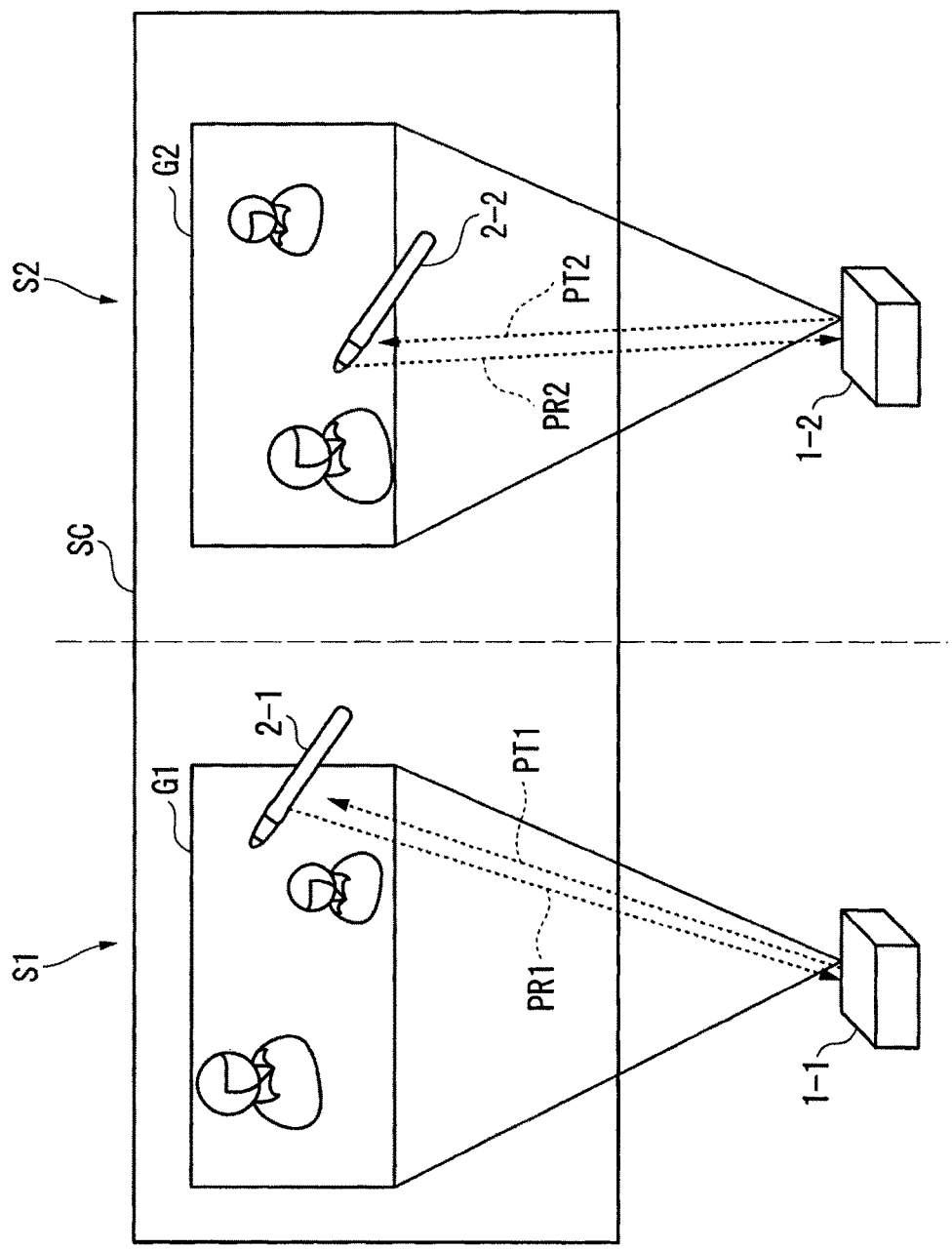

[Fig. 2]
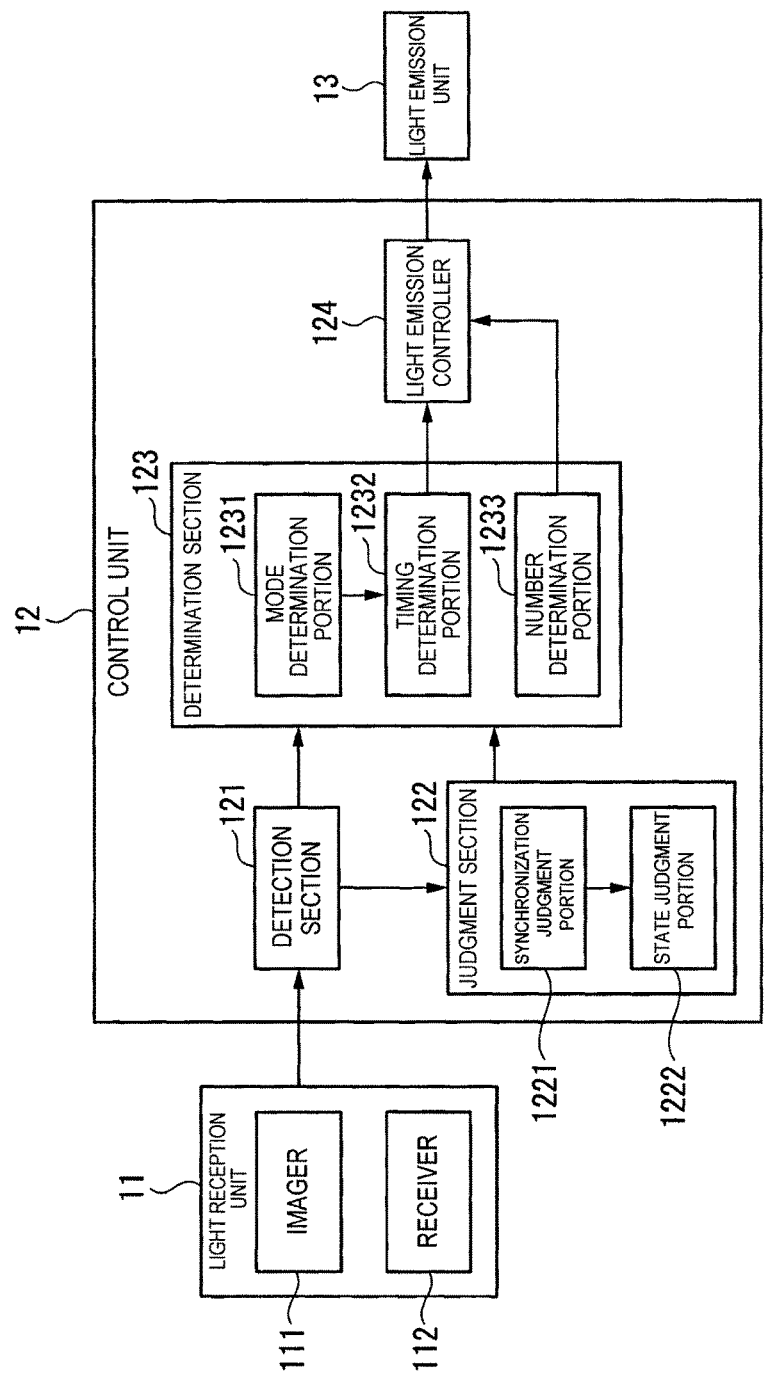

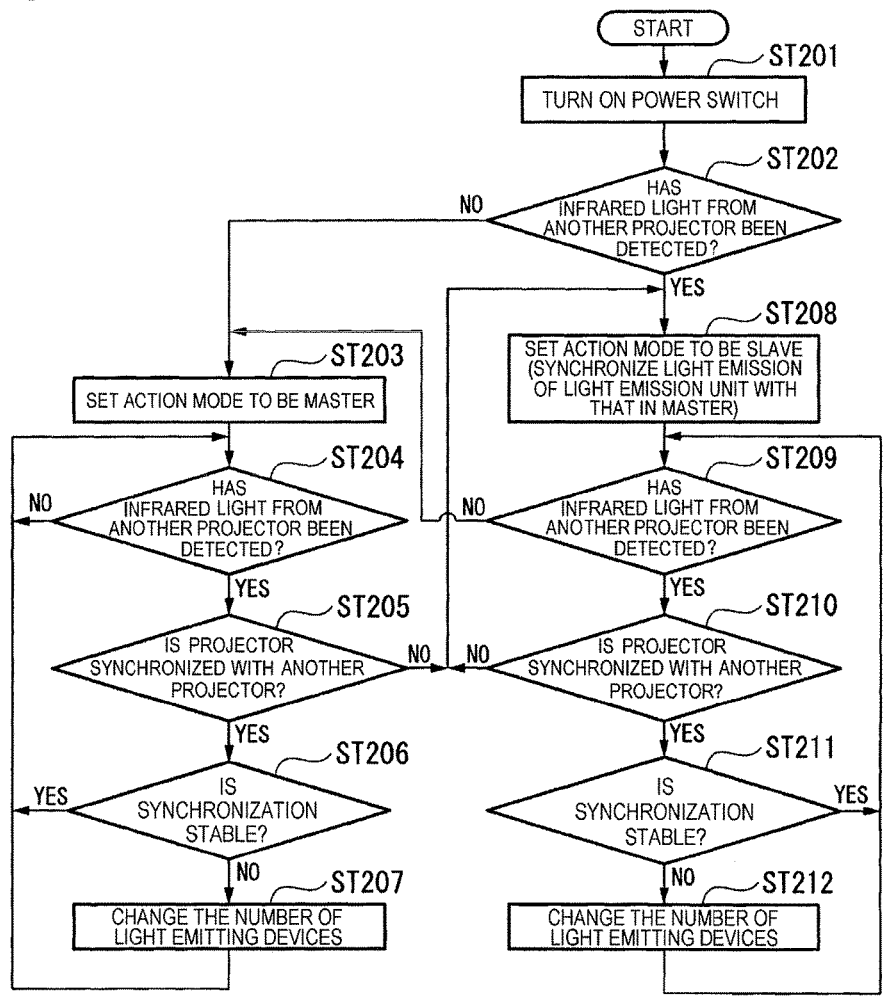

PROJECTOR AND CONTROL METHOD

CROSS REFERENCE TO RELATED APPLICATIONS

The entire disclosure of Japanese Patent Application No. 2013-055372, filed Mar. 18, 2013 is expressly incorporated by reference herein.

TECHNICAL FIELD

The present invention relates to a projector and a control method.

BACKGROUND ART

There is a known interactive system including a projector that projects an image and a light emitting pen that is operated by a user on the projected image (see PTL 1, for example). The light emitting pen emits infrared light through the nib thereof, and the projector detects the infrared light emitted from the light emitting pen and recognizes what user's operation is. In a proposed interactive system of this type, the projector also includes a light emitting device that emits infrared light for synchronized communication between the projector and the light emitting pen. In this system, the light emitting pens emits light in response to the infrared light emitted from the projector.

CITATION LIST

Patent Literature

[PTL 1]
JP-A-2012-173447

SUMMARY OF INVENTION

Technical Problem

When the interactive system described above is disposed at a plurality of locations close to each other, one of the light emitting pens undesirably receives infrared light fluxes transmitted from a plurality of the projectors in some cases. In such cases, the light emitting pen attempts to respond to the infrared light fluxes, undesirably resulting in unsuccessful synchronization between the light emitting pen and the corresponding projector. To address the problem, configuring each of the projectors in such a way that the projector, when it receives infrared light from any of the other projectors, emits infrared light at the same timing in response thereto prevents the light emitting pen associated with the projector from receiving infrared light fluxes from a plurality of the projectors at different timings. The projectors thus correctly operate. One of the projectors, however, cannot always receive infrared light from any of the other projectors in a stable manner depending on the distance between the two projectors and the arrangement thereof, which means that the projector may undesirably emit infrared light at an unstable timing.

Solution to Problem

An advantage of some aspects of the invention is to provide a projector and a control method that allow a plurality of projectors to be used and to operate in a stable manner.

(1) An aspect of the invention is directed to a projector including a plurality of transmitters each of which transmits a signal, a receiver that receives signals transmitted from another projector, and a control unit that achieves synchronization of the signals between the projector and the another projector based on the signals transmitted from the another projector and received by the receiver, and the control unit includes a state judgment portion that judges whether or not the synchronization with the another projector is stable and a number determination portion that determines the number of transmitters to be used among the plurality of transmitters based on the judgment result made by the state judgment portion.

The thus configured projector monitors the signals received from the another projector and determines the number of transmitters to be used among the plurality of transmitters in accordance with the synchronization state representing whether or not the synchronization between the projector and the another projector is stable based on the signals received from the another projector to achieve stable synchronization with the another projector or suppress interference from the another projector, whereby a plurality of projectors can be used and allowed to operate in a stable manner.

(2) Another aspect of the invention is directed to the projector described above, wherein the control unit further includes a synchronization judgment portion that judges whether or not the projector is synchronized with the another projector and a timing determination portion that determines a timing at which each of the transmitters transmits the signal based on the judgment result made by the synchronization judgment portion.

The thus configured projector can control the synchronization among a plurality of projectors by judging whether or not the projectors are synchronized with each other and changing the timing at which each of the transmitters transmits the signal based on the judgment having been made.

(3) Still another aspect of the invention is directed to the projector described above, wherein the control unit further includes a mode determination portion that determines a mode of the projector to be one of the following modes based on the judgment result made by the state judgment portion: a primary mode in which the another projector is synchronized with the projector; and a secondary mode in which the projector is synchronized with the another projector.

The thus configured projector can track the state of synchronization among a plurality of projectors by judging the state of synchronization and allowing the mode determination portion to determine the mode of the projector to be the primary mode or the secondary mode in accordance with the judged state of synchronization.

(4) Yet another aspect of the invention is directed to the projector described above, wherein when the synchronization between the projector and the another projector is not stable, the state judgment portion judges that the projector is in an unstable state, and when the state judgment portion judges that the projector is in the unstable state, the number determination portion determines to increase or decrease the number of transmitters to be used among the plurality of transmitters.

The thus configured projector can change the magnitude of the transmitted signals by judging the state of synchronization and increasing or decreasing the number of transmitters that transmit the signals to the another projector based on the judged state of synchronization, whereby the synchronization between the projector and the another projector can be controlled.

(5) Still yet another aspect of the invention is directed to a method for controlling a projector including a first process of causing a plurality of transmitters to each transmit a signal, a second process of receiving signals transmitted from another projector, a third process of achieving synchronization of the signals between the projector and the another projector based on the signals received from the another projector in the second process, a fourth process of judging whether or not the synchronization with the another projector is stable, and a fifth process of determining the number of transmitters to be used among the plurality of transmitters based on the judgment result made in the fourth process.

In the thus configured control method, the projector monitors the signals received from the another projector and determines the number of transmitters to be used among the plurality of transmitters in accordance with the synchronization state representing whether or not the synchronization between the projector and the another projector is stable based on the signals received from the another projector to achieve stable synchronization with the another projector or suppress interference from the another projector, whereby a plurality of projectors can be used and allowed to operate in a stable manner.

According to the aspects of the invention, a plurality of projectors can be used and allowed to operate in a stable manner.

BRIEF DESCRIPTION OF DRAWINGS

FIG. 1 is a schematic view for describing a situation in which interactive systems according to an embodiment of the invention are used.

FIG. 2 is a schematic block diagram showing an example of the configuration of a projector according to the present embodiment.

FIG. 3 is a flowchart showing an example of detailed synchronization control performed by a control unit according to the present embodiment.

DESCRIPTION OF EMBODIMENT

Embodiment

An embodiment of the invention will be described below in detail with reference to the drawings.

FIG. 1 is a schematic view for describing a situation in which interactive systems S1 and S2 according to the embodiment of the invention are used.

The interactive system S1 includes a projector 1-1 and a light emitting pen 2-1.

The projector 1-1 projects an image G1 on a projection surface SC. A user can point part of the image G1 projected on the projection surface SC (hereinafter referred to as projected image) and draw a figure, a character, and other objects on the image G1 by using the light emitting pen 2-1. At this point, the projector 1-1 and the light emitting pen 2-1 are synchronized with each other based on infrared light communication. That is, the projector 1-1 emits (transmits) infrared light PT1 in a predetermined light emission pattern, and the light emitting pen 2-1 receives the infrared light PT1 from the projector 1-1 and then emits (transmits) infrared light PR1 in response to the reception of the infrared light PT1. The projector 1-1 then receives the infrared light PR1 and recognizes, for example, the position where the light emitting pen 2-1 has emitted light.

The projector 1-1 thus produces an image according to user's operation of the light emitting pen 2-1, which is called an operation image, and projects a new projected image G1, which is the previous projected image G1 on which the produced operation image is superimposed, on the projection surface SC.

The interactive system S2 includes a projector 1-2 and a light emitting pen 2-2.

The projector 1-2 projects an image G2 on the projection surface SC. A user can point part of the image G2 projected on the projection surface SC and draw a figure, a character, and other objects on the image G2 by using the light emitting pen 2-2. At this point, the projector 1-2 and the light emitting pen 2-2 are synchronized with each other based on infrared light communication. That is, the projector 1-2 emits infrared light PT2 in a predetermined light emission pattern, and the light emitting pen 2-2 receives the infrared light PT2 from the projector 1-2 and then emits infrared light PR2 in response to the reception of the infrared light PT2. The projector 1-2 then receives the infrared light PR2 and recognizes, for example, the light emission position.

The projector 1-2 thus produces an image according to user's operation of the light emitting pen 2-2, which is called an operation image, and projects a new projected image G2, which is the previous projected image G2 on which the produced operation image is superimposed, on the projection surface SC.

When the interactive systems S1 and S2 are installed at locations relatively close to each other, the infrared light PT1 emitted from the projector 1-1, for example, may be undesirably received by the light emitting pen 2-2 in some cases. In such cases, the light emitting pen 2-2 attempts to emit light in response to both the infrared light PT1 from the projector 1-1 and the infrared light PT2 from the projector 1-2, resulting in unsuccessful synchronization between the projector 1-2 and the light emitting pen 2-2.

To address the problem, synchronizing the projectors 1-1 and 1-2 with each other to cause them to emit the infrared light PT1 and the infrared light PT2 at the same timing prevents the light emitting pen 2-2 that receives both the infrared light PT1 and the infrared light PT2 from responding to both the projectors 1-1 and 1-2 but allows the light emitting pen 2-2 to be successfully synchronized with the projector 1-2.

It is assumed in the present embodiment that the infrared light PT1 for synchronizing the projector 1-1 with the light emitting pen 2-1 and the infrared light PT2 for synchronizing the projector 1-2 with the light emitting pen 2-2 are used as they are to synchronize the projectors 1-1 and 1-2 with each other. That is, the infrared light PT1 and the infrared light PT2 are sync signals not only for synchronizing the projector 1-1 with the light emitting pen 2-1 and the projector 1-2 with the light emitting pen 2-2 respectively but also for synchronizing the projectors 1-1 and 1-2 with each other.

In the following description, the projectors 1-1 and 1-2 are collectively called a projector 1 unless otherwise stated because the configuration of the projector 1-1 is the same as the configuration of the projector 1-2. Similarly, the light emitting pens 2-1 and 2-2 are collectively called a light emitting pen 2.

FIG. 2 is a schematic block diagram showing an example of the configuration of the projector 1 according to the present embodiment.

The projector 1 includes a light reception unit 11, a control unit 12, and a light emission unit 13. The light reception unit 11 includes an imager 111 and a receiver 112. The control unit 12 includes a detection section 121, a judgment section 122, a determination section 123, and a light emission controller 124. The judgment section 122 includes a synchronization judgment portion 1221 and a state judgment portion 1222. The determination section 123 includes a mode determination portion 1231, a timing determination portion 1232, and a number determination portion 1233. The projector 1 has other functions of a typical projector (image projection function, for example), but the other functions will not be illustrated or described.

The imager 111 focuses light (infrared light, for example) emitted from an imaging target object on an imaging device. Specifically, the imager 111 includes a CCD (charge coupled device) sensor, a CMOS (complementary metal oxide semiconductor) sensor, or any other imaging device (not shown) and an imaging lens (not shown). The imager 111 is, for example, disposed in the vicinity of a projection lens (not shown) of the projector 1 and captures images of a projected-image-containing area of the projection surface SC at a predetermined frame rate. The imager 111 produces image information representing images captured with the imaging device (hereinafter referred to as captured images) and outputs the produced image information to the detection section 121.

The receiver 112 receives the infrared light emitted from the light emitting pen 2, the other projector 1, or any other object and outputs a reception result (received information) to the detection section 121.

The detection section 121 includes a CPU (central processing unit), a RAM (random access memory) used, for example, to temporarily store a variety of data, a mask ROM (read only memory), a flash memory, an FeRAM (ferroelectric random access memory), or any other nonvolatile memory, and an image analysis processor (none of the above components is shown). The detection section 121, in which the CPU operates in accordance with a control program stored in the nonvolatile memory, controls the action of the light reception unit 11.

The detection section 121 analyzes the image information inputted from the imager 111 to detect the coordinates of the position on the captured image where the light emitting pen 2 has emitted light. The detection section 121 converts the detected coordinates of the position of the light emitting pen 2 on the captured image into the coordinates of the on-image position in the input image signal to produce information on the position of the light emitting pen 2. In the control unit 12, an image processor (not shown) reflects the positional information produced by the detection section 121 in the projected image by superimposing a predetermined mark or any other object in a position based on the positional information.

The detection section 121 further analyzes the received information inputted from the receiver 112 to detect the infrared light emitted from the other projector 1. When the infrared light emitted from the other projector 1 is detected, the detection section 121 outputs detection timing information representing the timing at which the infrared light has been emitted to the judgment section 122 and the determination section 123. When no infrared light emitted from the other projector 1 is detected, the detection section 121 outputs non-detection information representing that no infrared light has been detected to the determination section 123.

The synchronization judgment portion 1221 judges whether or not the projectors 1 are synchronized with each other (whether or not projector 1-1 and projector 1-2 are synchronized with each other, for example) based on the detection timing information inputted from the detection section 121 and setting timing information set in the light emission controller 124, which will be described later, (information on timing at which light emission unit 13 actually emits light). Specifically, the synchronization judgment portion 1221 compares the timing represented by the detection timing information with the timing represented by the setting timing information. When the two timings coincide with each other, the synchronization judgment portion 1221 judges that the projector in which the synchronization judgment portion 1221 is included (projector 1, hereinafter sometimes referred to as own projector) is synchronized with the other projector 1. On the other hand, when the timing represented by the detection timing information differs from the timing represented by the setting timing information, the synchronization judgment portion 1221 judges that the own projector is not synchronized with the other projector 1. The synchronization judgment portion 1221 outputs the judgment result to the state judgment portion 1222.

The state judgment portion 1222 judges the state of synchronization between the own projector and the other projector 1 based on the judgment result inputted from the synchronization judgment portion 1221. Specifically, when a judgment result representing that the synchronization is achieved is not inputted from the synchronization judgment portion 1221 within a predetermined period, the state judgment portion 1222 judges that the own projector and the other projector 1 are not synchronized with each other or are in an asynchronous state. On the other hand, when the judgment result representing that the synchronization is achieved is inputted from the synchronization judgment portion 1221 within the predetermined period at a frequency higher than or equal to a predetermined value, the state judgment portion 1222 judges that the own projector and the other projector 1 are synchronized with each other in a stable manner or are in a stable state. Further, when the judgment result representing that the synchronization is achieved is inputted from the synchronization judgment portion 1221 within the predetermined period at a frequency lower than the predetermined value, the state judgment portion 1222 judges that the own projector and the other projector 1 are synchronized with each other in an unstable manner or are in an unstable state. The state judgment portion 1222 outputs state information representing the judgment result to the determination section 123.

The mode determination portion 1231 determines an action mode of the projector 1 based on the non-detection information inputted from the detection section 121, the state information inputted from the state judgment portion 1222, and other types of information. Specifically, the mode determination portion 1231 determines the action mode to be a primary mode in which the other projector 1 is synchronized with the own projector (hereinafter sometimes referred to as master) or a secondary mode in which the own projector is synchronized with the other projector (hereinafter sometimes referred to as slave). For example, the mode determination portion 1231 determines the action mode to be the primary mode when the non-detection information is inputted from the detection section 121, whereas determining the action mode to be the secondary mode when state information representing the asynchronous state is inputted from the state judgment portion 1222. The mode determination portion 1231 outputs mode information representing the determined mode to the timing determination portion 1232.

The timing determination portion 1232 determines the timing at which the limit emission unit 13 emits light based on the detection timing information inputted from the detection section 121 and the mode information inputted from the mode determination portion 1231. Specifically, when the mode information shows the secondary mode, the timing determination portion 1232 outputs the inputted detection timing information as the setting timing information to the light emission controller 124 so that the light emission unit 13 emits light at the timing represented by the detection timing information.

The number determination portion 1233 determines the number of light emitting devices driven to emit light among a plurality of light emitting devices provided in the light emission unit 13 based, for example, on the state information inputted from the state judgment portion 1222 and outputs the determined number as number information to the light emission controller 124.

The light emission controller 124 controls the light emission of the light emission unit 13 based on the setting timing information inputted from the timing determination portion 1232 and the number information inputted from the number determination portion 1233. Specifically, the light emission controller 124 causes the light emitting devices the number of which is represented by the number information to emit light at the timing represented by the setting timing information.

The light emission unit 13 includes a plurality of light emitting devices, for example, infrared LEDs, which are caused to emit light under the control of the light emission controller 124.

FIG. 3 is a flowchart showing an example of, detailed synchronization control performed by the control unit 12 according to the present embodiment.

In step ST201, having acquired an operation signal representing that the user has switched the state of a power switch from an off state to an on state, the control unit 12 performs synchronization control including processes in step ST202 and the following steps.

In step ST202, the detection section 121 attempts to detect the infrared light emitted from the other projector 1. When the infrared light is detected (Yes), the detection section 121 outputs the detection timing information representing the timing at which the detected infrared light has been emitted to the judgment section 122 and the determination section 123, and the control proceeds to step ST208. On the other hand, when the infrared light emitted from the other projector 1 is not detected (No), the detection section 121 outputs the non-detection information to the determination section 123, and the control proceeds to step ST203.

In step S203, when the non-detection information is inputted from the detection section 121, the mode determination portion 1231 sets the action mode to be the master, and the control proceeds to step ST204.

In step ST204, the detection section 121 attempts to detect the infrared light emitted from the other projector 1 again. When the infrared light is detected (Yes), the detection section 121 outputs the detection timing information to the judgment section 122 and the determination section 123, and the control proceeds to step ST205. On the other hand, when the infrared light emitted from the other projector 1 is not detected (No), the detection section 121 outputs the non-detection information to the determination section 123 and repeats step ST204.

In step ST205, the synchronization judgment portion 1221 judges whether or not the detected other projector 1 is synchronized with the own projector. Further, the state judgment portion 1222 judges the state of synchronization between the own projector and the other projector 1 based on the judgment result from the synchronization judgment portion 1221. When the synchronization judgment portion 1221 judges that the own projector is synchronized with the other projector 1 (Yes), the control proceeds to step ST206. On the other hand, when the synchronization judgment portion 1221 judges that the own projector is not synchronized with the other projector 1 (No), the control proceeds to step ST208 and the mode determination portion 1231 sets the action mode to be the slave.

In step ST206, the state judgment portion 1222 judges whether or not the synchronization between the own projector and the other projector 1 is stable. When the synchronization is stable (Yes), the control returns to step ST204. On the other hand, when the synchronization is not stable (No), the control proceeds to step ST207.

In step ST207, the number determination portion 1233 changes the number of light emitting devices driven to emit light among the plurality of light emitting devices provided in the light emission unit 13. The light emission controller 124 increases or decreases the number of light emitting devices driven to emit light based on the number determined by the number determination portion 1233, and the control returns to step ST204.

In step ST208, when the detection timing information is inputted from the detection section 121, the mode determination portion 1231 sets the action mode to be the slave. The timing determination portion 1232 then outputs the inputted detection timing information as the setting timing information to the light emission controller 124, and the control proceeds to step ST209. As a result, the light emission unit 13 emits light at the timing represented by the detection timing information. That is, synchronized with the master projector 1, the light emission unit 13 emits light.

In step ST209, the detection section 121 attempts to detect the infrared light emitted from the other projector 1 again. When the infrared light is detected (Yes), the detection section 121 outputs the detection timing information to the judgment section 122 and the determination section 123, and the control proceeds to step ST210. On the other hand, when the infrared light emitted from the other projector 1 is not detected (No), the detection section 121 outputs the non-detection information to the determination section 123, and the control proceeds to step ST203, where the mode determination portion 1231 set the action mode to be the master.

In step ST210, the synchronization judgment portion 1221 judges whether or not the own projector is synchronized with the detected other projector 1. Further, the state judgment portion 1222 judges the state of synchronization between the own projector and the other projector based on the judgment result from the synchronization judgment portion 1221. When the synchronization judgment portion 1221 judges that the own projector is synchronized with the other projector 1 (Yes), the control proceeds to step ST211. On the other hand, when the synchronization judgment portion 1221 judges that the own projector is not synchronized with the other projector 1 (No), the control returns to step ST208.

In step ST211, the state judgment portion 1222 judges whether or not the synchronization between the own projector and the other projector 1 is stable. When the synchronization is stable (Yes), the control returns to step ST209. On the other hand, when the synchronization is not stable (No), the control proceeds to step ST212.

In step ST212, the number determination portion 1233 changes the number of light emitting devices driven to emit light among the plurality of light emitting devices provided in the light emission unit 13. The light emission controller 124 increases or decreases the number of light emitting devices driven to emit light based on the number determined by the number determination portion 1233, and the control returns to step ST209.

When a plurality of projectors 1, each of which operates as described above, are in operation, a projector 1 that has started operating early is set to be the master, and a projector 1 that has started operating later is set to be the slave when the master projector 1 is detected. In the projector 1 having been set to be the slave, the light emission unit 13 emits light in synchronization with the projector 1 having been set to be the master. The master projector 1 may be switched to the slave projector 1 and vice versa in accordance with the state of synchronization between the two projectors 1, or the two projectors 1 may both operate as the master. When the synchronization is unstable, the number of light emitting devices is changed.

In steps ST207 and ST212, the number of light emitting devices driven to emit light may be either increased or decreased. For example, in a state in which the synchronization between two projectors 1 is unstable, increasing the number of light emitting devices driven to emit light in both the projectors 1 tends to achieve stable synchronization because the infrared light from each of the projectors 1 tends to reach the other. On the other hand, decreasing the number of light emitting devices driven to emit light in both the projectors 1 tends to cause transition from the unstable synchronization state to the asynchronous state because the infrared light from each of the projectors 1 does not tend to reach the other. As a result, a situation in which the infrared light emitted from each of the projectors 1 interferes with the infrared light in the other interactive system will not occur, resulting in stable operation in each of the interactive systems. In this case, both the projectors 1 operate as the master. Further, when the number of light emitting devices driven to emit light is increased in one of the projectors 1 and the number of light emitting devices driven to emit light is decreased in the other projector 1, the projector 1 in which a larger number of light emitting devices emit light is set to be the master and the projector 1 in which a smaller number of light emitting devices emit light is set to be the slave. In this case as well, the synchronization between the two projectors tends to be stable because the infrared light from the master projector 1 tends to reach the slave projector 1.

The present embodiment has been described with reference to two interactive systems, but the invention is similarly applicable to a case where three or more interactive systems are disposed in positions close to each other. Further, the description has been made of the case where the light emission unit 13 in the projector 1 emits infrared light and the light emitting pen 2 also emits infrared light, but they may, for example, emit visible light. Moreover, the light emitted from the light emission unit 13 in the projector 1 and the light emitted from the light emitting pen 2 may differ from each other in terms of wavelength.

As described above, according to the present embodiment, the projector 1 includes a plurality of transmitters each of which transmits a signal (plurality of light emitting devices in light emission unit 13), a receiver (light reception unit 11) that receives signals transmitted from the other projector 1, the control unit 12, which achieves signal synchronization between the own projector and the other projector 1 based on the signals transmitted from the other projector 1 and received by the receiver (light reception unit 11), the state judgment portion 1222, which judges whether or not the synchronization with the other projector is stable, and the number determination portion 1233, which determines the number of transmitters (light emitting devices in light emission unit 13) to be used among the plurality of transmitters (light emitting devices in light emission unit 13) based on the judgment result made by the state judgment portion 1222.

The thus configured projector 1 monitors the signals received from the other projector 1 and determines the number of transmitters (number of light emitting devices in light emission unit 13) to be used among the plurality of transmitters (light emitting devices in light emission unit 13) in accordance with the synchronization state representing whether or not the synchronization between the own projector and the other projector 1 is stable based on the signals received from the other projector to achieve stable synchronization with the other projector 1 or suppress interference from the other projector, whereby a plurality of projectors can be used and allowed to operate in a stable manner.

Part or the entire of the projector 1 in the embodiment described above may be achieved by a computer. In this case, a program for achieving the control function of the projector may be stored on a computer readable storage medium, and the program stored on the storage medium may be read into a computer system and executed to achieve the control function.

The "computer system" used herein is assumed to be a computer system built in the projector 1 and including an OS and a peripheral apparatus or any other type of hardware. Further, the "computer readable storage medium" used herein refers to a flexible disk, an magneto-optical disk, a ROM, a CD-ROM, and other portable media and a hard disk drive and other storage devices built in the computer system. Moreover, the "computer readable storage medium" also may include a medium that dynamically holds a program for a short period, such as a communication line in a case where the program is transmitted via the Internet or any other network or a telephone network line or any other communication network line and a medium that holds a program for a fixed period, such as a volatile memory in a computer system that serves as a server or a client in the above situation. Further, the program described above may be a program that achieves part of the function described above. Moreover, the function described above may be achieved by any of the programs described above combined with a program having already been stored in the computer system.

Further, part or the entire of the projector 1 in the embodiment described above may be achieved in the form of an integrated circuit based, for example, on LSI (large scale integration). Each of the functional blocks of the projector 1 may be individually implemented in the form of a processor or part or the entire of the functional blocks may be integrated in the form of a processor. A method for implementing the components in the projector in the form of an integrated circuit is not necessarily based on LSI but may be based on a dedicated circuit or a general-purpose processor. Further, when advances of semiconductor technologies allow advent of an integrated circuit technology that replaces LSI, an integrated circuit based on the technology may be used.

The embodiments of the invention has been described above in detail with reference to the drawings. The specific configurations are not limited to those described above, and a variety of design changes and other modifications can be made thereto to the extent that they do not depart from the substance of the invention.

REFERENCE SIGNS LIST

S1, S2 Interactive system
1, 1-1, 1-2 Projector 2, 2-1, 2-2, Light emitting pen
11 Light reception unit
111 Imager
112 Receiver
12 Control unit
121 Detection section
122 Judgment section
1221 Synchronization judgment portion
1222 State judgment portion
123 Determination section
1231 Mode determination portion
1232 Timing determination portion
1233 Number determination portion
124 Light emission controller
13 Light emission unit

The invention claimed is:

1. A projector comprising:
a plurality of transmitters each of which transmits a first signal to a first light emitting pen;
an imager that captures an image of light emitted from the first light emitting pen, the light being emitted from the first light emitting pen in response to a reception of the first signal;
a receiver that receives an infrared light transmitted from another projector to a second light emitting pen; and
a processor configured to act as a control unit that achieves, when the receiver receives the infrared light, synchronization of the timing of the first signal and the infrared light between the projector and the another projector such that the first signal and the infrared light are transmitted at a same time, wherein
the control unit includes
a detection section that detects, based on the image captured by the imager, a position where the first light emitting pen has emitted light,
a state judgment portion that judges whether or not the synchronization with the another projector is stable, and
a number determination portion that determines a number of transmitters to be used among the plurality of transmitters based on a judgment result made by the state judgment portion.

2. The projector according to claim 1, wherein
the control unit further includes
a synchronization judgment portion that judges whether or not the projector is synchronized with the another projector, and
a timing determination portion that determines a timing at which each of the transmitters transmits the first signal based on the judgment result made by the synchronization judgment portion.

3. The projector according to claim 1, wherein
the control unit further includes
a mode determination portion that determines a mode of the projector to be one of the following modes based on the judgment result made by the state judgment portion: a primary mode in which the another projector is synchronized with the projector; and a secondary mode in which the projector is synchronized with the another projector.

4. The projector according to claim 3, wherein when the state judgment portion judges that the synchronization between the projector and the another projector is not stable, the number determination portion determines to increase or decrease the number of transmitters to be used among the plurality of transmitters.

5. A method for controlling a projector comprising:
a first process of causing a plurality of transmitters to each transmit a first signal to a first light emitting pen;
a second process of capturing an image of light emitted from the first light emitting pen, the light being emitted from the first light emitting pen in response to a reception of the first signal;
a third process of detecting, based on the captured image, a position where the first light emitting pen has emitted the light;
a fourth process of receiving an infrared light transmitted to a second light emitting pen from another projector;
a fifth process of achieving, when the infrared light is received in the fourth process, synchronization of the timing of the first signal and the infrared light between the projector and the another projector such that the first signal and the infrared light are transmitted at a same time;
a sixth process of judging whether or not the synchronization with the another projector is stable; and
a seventh process of determining a number of transmitters to be used among the plurality of transmitters based on a judgment result made in the fourth process.

6. The projector according to claim 1, wherein the plurality of transmitters each transmit an infrared signal.

7. The projector according to claim 1, wherein the state judgment portion judges whether or not the synchronization with the another projector is stable based on whether a result representing that the synchronization is achieved is received within a predetermined time period and at a frequency higher than or equal to a predetermined value.

* * * * *